United States Patent
Hu et al.

(10) Patent No.: US 12,420,727 B2
(45) Date of Patent: Sep. 23, 2025

(54) METHOD FOR CONTROLLING A POSITION OF AN ACTUATABLE OBJECT OF A VEHICLE

(71) Applicant: MCi (Mirror Controls International) Netherlands B.V., Woerden (NL)

(72) Inventors: Jinku Hu, Delft (NL); Hendrik Jan Meijdam, Utrecht (NL)

(73) Assignee: MCI (Mirror Controls International) Netherlands B.V., Woerden (NL)

( * ) Notice: Subject to any disclaimer, the term of this patent is extended or adjusted under 35 U.S.C. 154(b) by 114 days.

(21) Appl. No.: 18/683,139

(22) PCT Filed: Aug. 12, 2022

(86) PCT No.: PCT/NL2022/050469
§ 371 (c)(1),
(2) Date: Feb. 12, 2024

(87) PCT Pub. No.: WO2023/018333
PCT Pub. Date: Feb. 16, 2023

(65) Prior Publication Data
US 2024/0351534 A1    Oct. 24, 2024

(30) Foreign Application Priority Data
Aug. 13, 2021 (NL) .................... 2028970

(51) Int. Cl.
*B60R 16/023* (2006.01)
*H02P 23/14* (2006.01)

(52) U.S. Cl.
CPC .......... *B60R 16/0231* (2013.01); *H02P 23/14* (2013.01)

(58) Field of Classification Search
CPC ......... B60R 16/0231; B60R 1/07; B60R 1/28; H02P 23/14; H02P 3/08; H02P 2203/03;
(Continued)

(56) References Cited

U.S. PATENT DOCUMENTS

2002/0113566 A1    8/2002  Focking
2002/0141115 A1*  10/2002  Garrigues ................ G11B 5/54
(Continued)

FOREIGN PATENT DOCUMENTS

DE    102015113517 A1    2/2017

*Primary Examiner* — Behrang Badii
(74) *Attorney, Agent, or Firm* — Volpe Koenig

(57) ABSTRACT

As first aspect provides, in an electronic control circuit, a method of controlling an electromotor of an actuator for controlling a position of an actuatable object of a vehicle. The method comprises receiving an instruction to hold position of the actuatable object, obtaining an initial hold voltage pattern for the electromotor and applying the initial hold voltage pattern to the electromotor. The method further comprises determining movement data on movement of the actuatable object, determining an adjusted hold voltage pattern based on the movement data and applying the adjusted hold voltage pattern to the electromotor. By applying a particular voltage to the electromotor—stator, rotor or both, depending on the type—, a magnetic force between rotor and stator may be created to counteract any external force. The voltage applied for holding the stator is determined on detection of any movement of the rotor.

18 Claims, 3 Drawing Sheets

(58) Field of Classification Search
CPC ........... H02P 3/025; H02P 7/06; B62D 37/02;
B62D 35/00; B60K 11/085
See application file for complete search history.

(56) References Cited

U.S. PATENT DOCUMENTS

| | | | |
|---|---|---|---|
| 2008/0258663 | A1 | 10/2008 | Walls |
| 2017/0282687 | A1* | 10/2017 | Kalore ............... B60H 1/00857 |
| 2020/0062108 | A1 | 2/2020 | Brand et al. |
| 2021/0341023 | A1* | 11/2021 | Hodrus ................... F16D 48/06 |
| 2022/0235578 | A1* | 7/2022 | Ryu ........................ E05B 47/00 |

* cited by examiner

METHOD FOR CONTROLLING A POSITION OF AN ACTUATABLE OBJECT OF A VEHICLE

CROSS REFERENCE TO RELATED APPLICATIONS

This application is a 35 USC §371 National Stage application of International Application No. PCT/NL2022/050469, filed Aug. 12, 2022, entitled "METHOD FOR CONTROLLING A POSITION OF AN ACTUATABLE OBJECT OF A VEHICLE", and claims priority to Netherlands Patent Application No. 2028970, filed Aug. 13, 2021, which are incorporated by reference as if fully set forth.

TECHNICAL FIELD

The various aspects and implementations thereof relate to a method and devices for controlling an electromotor to hold position of an actuatable object arranged to be driven by the electromotor.

BACKGROUND

Actuatable parts of cars, like mirror and mirror adjustment arrangements, shutters for a grille, actuatable spoilers or other air guiding flaps, screen wipers, doors, windows, are generally controlled by electromotors. The electromotor drives the object, either directly or via a drive train, to a desired position. In that position, the object may be locked. This is feasible if the desired position is always the same, as this makes the positioning of the locking mechanism convenient to place. If a desired position of the object does not have a specific location relative to the car, locking is more difficult.

SUMMARY

Holding an actuatable object in place may be arranged by providing sufficient friction. An issue with such friction, is that during movement of the object, the friction force is to be overcome, which may result in wear of couplings and requires a significant amount of electrical power. It is preferred to provide improved holding control for actuatable parts of vehicle, in particular air guiding flaps.

As first aspect provides, in an electronic control circuit, a method of controlling an electromotor of an actuator for controlling a position of an actuatable object of a vehicle. The method comprises receiving an instruction to hold position of the actuatable object, obtaining an initial hold voltage pattern for the electromotor and applying the initial hold voltage pattern to the electromotor. The method further comprises determining movement data on movement of the actuatable object, determining an adjusted hold voltage pattern based on the movement data and applying the adjusted hold voltage pattern to the electromotor.

Holding a position of a rotor of an electromotor may established in mechanical ways, but this may require complex mechanical structures—in particular if the actuatable object is to be set at a position between extremities and/or the actuatable object is subject to external forces, like wind. By applying a particular voltage to the electromotor—stator, rotor or both, depending on the type—, a magnetic force between rotor and stator may be created to counteract any external force. The voltage applied for holding the stator is determined on detection of any movement of the rotor.

This movement may be detected by monitoring voltage over the motor, preferably at the terminals, with either supply voltage applied or interrupted. Movement of the rotor relative to the stator results in a change of magnetic field within electromagnets of the motor—in stator, rotor, or both—, which results in a voltage over the electromagnets or a change of the value of that voltage. and any movement may be detected by detecting such change of the voltage. But additionally or alternatively, any movement of the rotor may also be detected by mechanical or electromechanical means, like switches, (rotating) potentiometers, other, or a combination thereof.

By adjusting the applied voltage in response to detection of movement and preferably in response to a detected amount of movement, the position and in particular the holding position of the rotor and with that, the position of the actuatable object may be accurately controlled.

In an implementation, determining movement data comprises determining at least one of a motor current through the electromotor and a motor voltage over the electromotor and obtaining motor data. The implementation further comprises, based on the motor data and the at least one of the motor current and the motor voltage, determining the back electromotive force of the electromotor and, based on the back electromotive force, determining the movement data.

The current and voltage may be determined during normal operation of the electromotor. Using the resistance of the coil wiring of the electromotor—or the resistance in rest state—, the 'Ohmic' voltage over the windings may be determined, using the obtained value of the current. With the voltage over the terminals of the electromotor and a motor-dedicated constant, the back electromagnetic force—the back EMF—may be determined. The back EMF is a result of stator and rotor moving relative to one another—and if the back EMF is zero, there is no movement. Hence, in this implementation, the voltage to be applied may be determined based on the back EMF. But the obtained values of current and/or voltage may also be employed in different ways to determine movement of the rotor.

A further implementation further comprises comparing a magnitude of the back electromotive force to a first pre-determined value, determining, if the magnitude of the back electromotive force is less than the first pre-determined value, that the adjusted voltage pattern is zero. A variation of this implementation is to maintain the supply voltage at the current level, either constant or average, as discussed below. If the magnitude back electromotive force is more than the first pre-determined value, the applied voltage may be increased or decreased, based on the sign of the back EMF and the sign of the applied voltage. This is discussed below in further detail.

Again another implementation further comprises comparing a magnitude of the back electromotive force or of the determined adjusted voltage to a second pre-determined value. If the magnitude of the back electromotive force or of the determined adjusted voltage exceeds the second pre-determined value, one of the following actions may be performed: setting the adjusted voltage pattern to zero; and determining, based on the back electromotive force, a safety voltage pattern and applying the safety voltage pattern to the electromotor.

Applying a voltage for holding the actuatable element that may be too high for the system—in the sense that it may result in burn-out of motor windings or damage to the actuatable element—action is taken to prevent or at least reduce damage. Such action may be to let the rotor run free or to apply a voltage to direct the rotor and/or the actuatable element to a safe position. If the back EMF is a measure for the adjusted holding voltage to be applied, the back EMF may be tested, without or prior to determining the adjusted voltage. Additionally or alternatively, the adjusted holding voltage may be tested for safety, preferably prior to applying that voltage.

In a yet a further implementation, obtaining an initial hold voltage pattern for the electromotor comprises obtaining the back electromotive force of the electromotor; and obtaining the initial hold voltage pattern for the electromotor based on the determined back electromotive force of the electromotor. The values may be obtained from a memory or by measurement. The back EMF voltage obtained by measurement is preferably the back EMF at the moment the rotor reaches the position corresponding to the hold instruction received.

Again a further implementation further comprises obtaining vehicle speed data related to a speed of the vehicle; and determining the adjusted hold voltage pattern is based on the vehicle speed data. This implementation is particularly relevant if the actuatable element is an air guiding element of a vehicle, like a grille shutter or a spoiler. The speed of a vehicle is an indication of a wind force acting on the actuatable element, which may be taken into account for determining the holding voltage as it is (also) to counter the wind force. As an option, the speed may be derived from cruise control settings of the vehicle.

Yet another implementation further comprises determining the adjusted hold voltage pattern based on the movement data such that the actuatable object is held in the current position, obtaining a pre-determined safety voltage pattern and comparing the determined hold voltage pattern to the safety voltage pattern. The implementation further comprises, based on the comparing, determining whether the determined hold voltage pattern is safe to apply to the electromotor and, if the determined hold voltage is determined as safe to be applied, applying the determined hold voltage. As discussed above, this option provides safety and prevent damage or reduces risk of damage.

In again another implementation, the adjusted hold voltage pattern comprises a waveform that varies in time between a maximum value and a minimum value. Preferably, the magnitude of the average value of the voltage of the adjusted hold voltage pattern is substantially equal to the magnitude of the back electromotive force. As such, the electromotor may receive a pulse code modulated supply voltage. As an option, a capacitance may be used as a damping element for smoothing the waveform.

A second aspect provides an electronic control circuit arranged to control an electromotor of an actuator for controlling a position of an actuatable object in a vehicle. The control circuit is arranged to receive an instruction to hold position of the actuatable object, obtain an initial hold voltage pattern for the electromotor, apply the initial hold voltage pattern to the electromotor, determine movement data on movement of the actuatable object, determine an adjusted hold voltage pattern based on the movement data and apply the adjusted hold voltage pattern to the electromotor.

A third aspect provides a control module arranged to control a position of an actuatable object in a vehicle, the control module comprising: actuatable object an actuator comprising electromotor connected to the actuatable object and arranged to drive the actuatable object and the electronic control circuit according to the second aspect connected to the electromotor and arranged to control the electromotor.

In an implementation of the third aspect, the electromotor is a brushed DC motor.

A fourth aspect provides a vehicle comprising a flap for guiding an airflow as an actuatable object; and the control module according to the third aspect of which the electromotor is connected to the actuatable object.

BRIEF DESCRIPTION OF THE DRAWINGS

The various aspects and implementations thereof will now be elucidated in further detail in conjunction with drawings. In the drawings.

DETAILED DESCRIPTION

Figure 1:
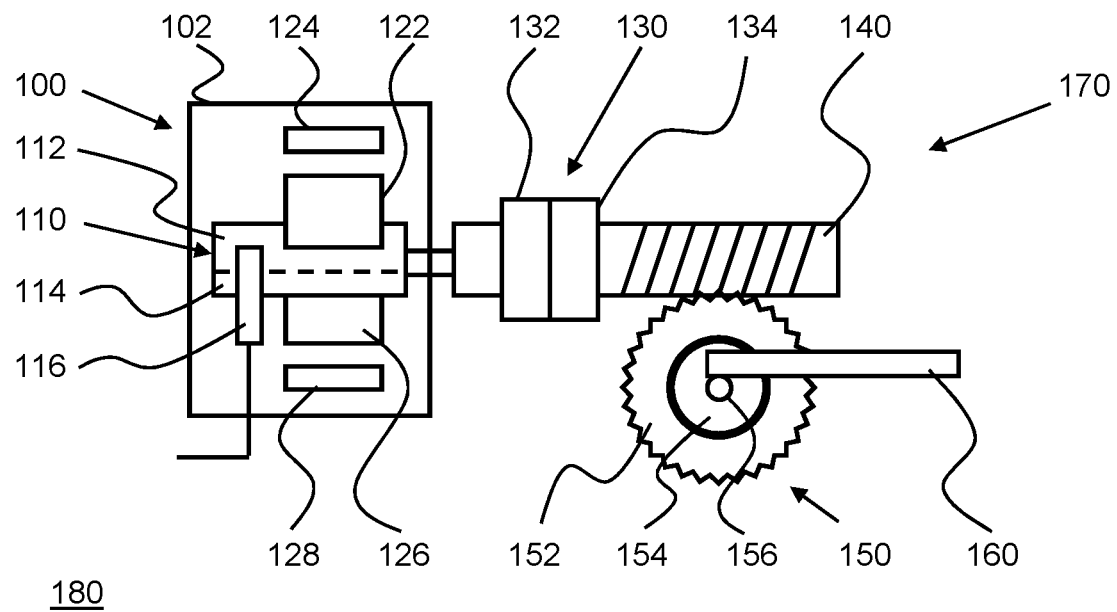
FIG. 1: shows an actuator comprising an electromotor and a drive train.

FIG. 1 shows a DC electromotor 100 that is coupled to a air guiding flap 160 via a drive train 170. The air guiding flap 160 may be part of an active grill shutter (AGS) system. The electromotor 100 comprises a housing 102, in which housing 102 a rotor 110 is provided. On the rotor 110, a first conductor 112 and a second conductor 114 are provided. Furthermore, one or more additional conductors are provided on the rotor 110. The conductors are provided for providing a current from the brush contact 116 to the first electromagnets 122 and the second electromagnet 126, provided as coils on the rotor 110. In the housing 102, also a first permanent magnet 124 and a second permanent magnet 128 are provided. Thus, the DC electromotor 100 is a commonly known electromotor as generally commercially available.

The drivetrain 170 comprises a slip coupling 130 provided between the rotor 110 and a worm wheel 140. The drivetrain 170 further comprises a toothed wheel or a gear 150 that is preferably provided on an axle 158. The connection between the worm wheel 140 and the gear 150 allows for a signification reduction in rotational speed, preferably in the order or a factor 50.

The first slip coupling 130 comprises a first slip part 132 connected to the rotor 100 and a second slip part 134 connected to the worm wheel 140. In normal operation, the first slip part 132 and the second slip part 134 rotate together. If the torque between the worm wheel 140 and the rotor 110 exceeds a pre-determined torque threshold, the second slip part 134 stalls and the first slip part 132 continues to rotate, in which operational state the slip coupling 130 is in slip mode. If the slip coupling 130 goes into slip, usually first the full drive train 170 will stall. Subsequently, the slip coupling 130 will run into slip mode. Depending on characteristics of contact surfaces of the first slip part 132 and the second slip part 134, the slip coupling 130 will stay in slip operation or alternate between slip and stall mode.

Additionally or alternatively, a second slip coupling is provided in the gear 150. The gear 150 comprises in this implementation an outer ring 152 and an inner ring 154. Between the inner ring 152 and the outer ring 154, the second slip coupling 156 is provided. The operation of the second slip coupling 156 is similar to that of the first slip coupling 130. The air guiding flap 160 is connected to the inner ring 156.

Whereas in this implementation the electromotor 100 is used for actuating the air guiding flap 160, in other implementations other actuatable parts of a car or other motorised vehicle may be actuated. Such actuatable parts may be a full rear view module including mirror and mirror adjustment arrangements, shutters for a grille, actuatable spoilers or other air guiding flaps, screen wipers, doors, windows, other, or a combination thereof.

Figure 2:
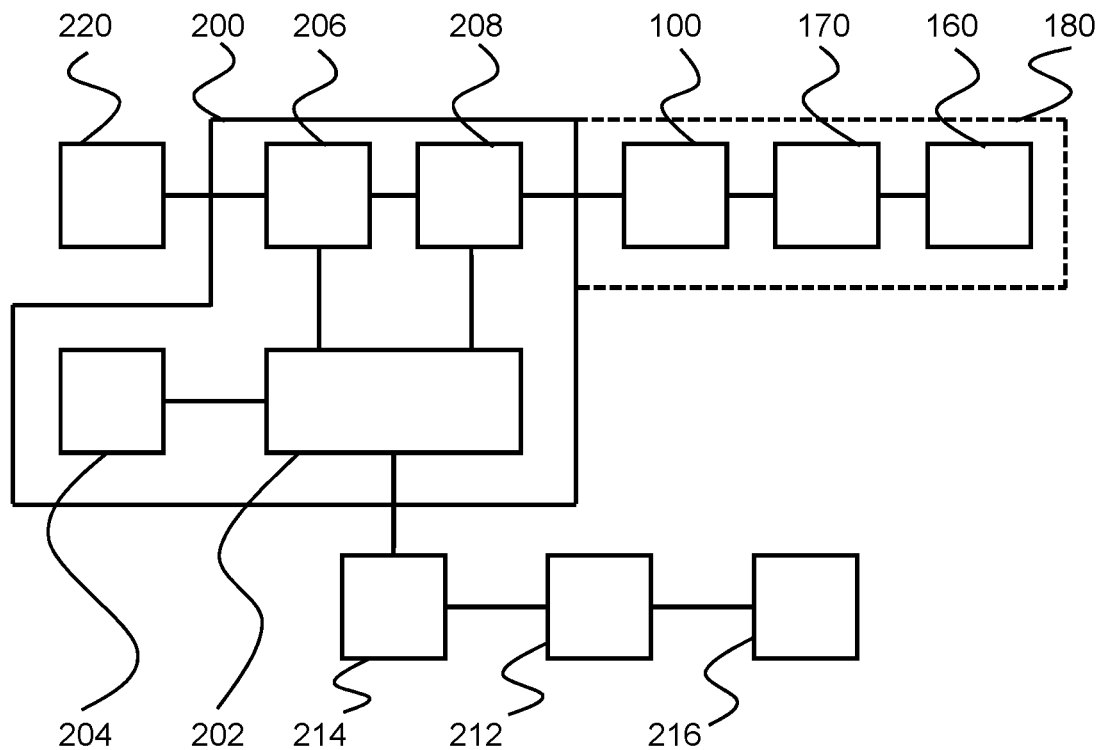
FIG. 2: shows a vehicle control system.

FIG. 2 shows a schematic view of a control system for operating the adjustment system shown by FIG. 1. FIG. 2 shows a driver control unit 200 for controlling operation of the adjustment system, a battery 220 for providing electrical power to the electromotor 110, a central vehicle control unit 212 that is coupled to the driver control unit 200 via a vehicle bus 214, a button 216 or a set of buttons as a user input unit and the adjustment system 180.

The vehicle bus 214 may operate in accordance with the CAN protocol, the LIN protocol, another protocol or a combination thereof. The central vehicle control unit 212 is arranged to receive data relate to the vehicle and one or more engines, like speed, temperature, energy consumption, other, or a combination thereof and to control various parts of the vehicle in response to acquire data, including user interaction.

The battery 220 is shown as coupled to the driver control unit 200 and it is coupled to the central vehicle control unit 212 as well. The button 216 is connected to the central vehicle control unit 212 for providing user commands. The driver control unit 200 is coupled to the adjustment system 180.

The driver control unit 200 comprises a switch 206 for switching power supply from the battery 220 to the electromotor 110 of the adjustment system 180. Between the switch 206 and the adjustment system 180, a current sensor 208 is provided. The current sensor 208 is arranged to sense current switched by the switch 206 and supplied to the electromotor 100. Optionally, an additional voltage sensor is provided to determine voltage over the electromotor 100. The switch 206 and the current sensor 208 are connected to a local control unit 202. To the local control unit 202, also a local memory 204 is connected.

Figure 3:
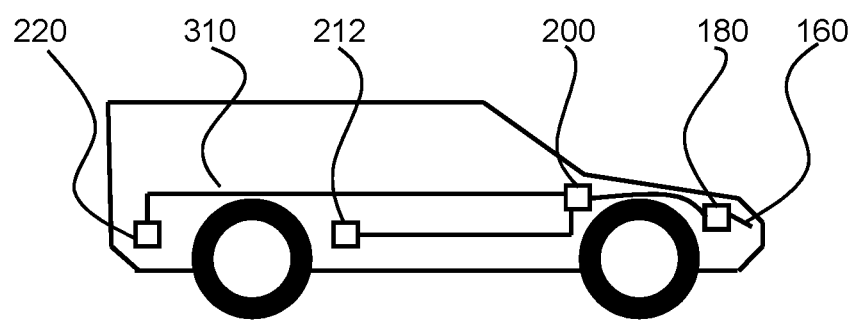
FIG. 3: shows a motorised vehicle comprising the vehicle control system.

FIG. 3 shows a car 300 as a motorised vehicle comprising the control system. The various components of the control system may be distributed over the car. At the back of the car, the battery 220 is provided for providing electrical power to the vehicle power supply network 310. In the middle of the car, the vehicle control unit 212 is located. The driver control unit 200 is located in the front of the car, preferably close to the adjustment system 180. The adjustment system 180 is connected to the flap 160 of the active grill shutter system. In another implementation, the adjustment system 180—or any other driving unit of another adjustment system—is arranged for adjusting the position of another air guiding flap, including, but not limited to any spoilers and the like for adjusting airflow at the back, front, top and/or bottom of the car 300.

The adjustment system 180 is preferably connected to the driver control unit 200 by means of one or two conductive wires. In case only one conductive wire is provided, a return path for current may be provided via the bodywork of the car 300. As the latter option may result in receiving a lot of signal noise in the connection between the driving units and the power supply module, this is not a preferred implementation. However, with the application of the right electronics, such implementation is explicitly not excluded. As indicated above, the driving units preferably do not comprise any electronics. Yet, for preferred operation of the car 300, it is preferred the driver control unit 200 controls the driving units such that positions of one or more controlled flaps may be relatively accurately controlled.

To this objective, the current sensor 208 is provided. The current sensor 208 is coupled to the processing module 202 such that the processing module 202 is able to detect certain variations in currents supplied to the driving units. The electromotors comprised by the driving units are preferably direct current motors and more in particular, brushed DC motors having two, three or more coils in the rotor 110. At each change of powering of the coils in the rotor 110, where contact between a static brush and the rotating rotor results in a contact switching between the brush and a first commutator to a second commutator, a variation occurs in the supply current provided to the driving unit. In conjunction with the current sensor 208, the local control unit 202 is arranged to count these variations. The number of variations counted may be used for determining an end position of the flap 160.

Figure 4:
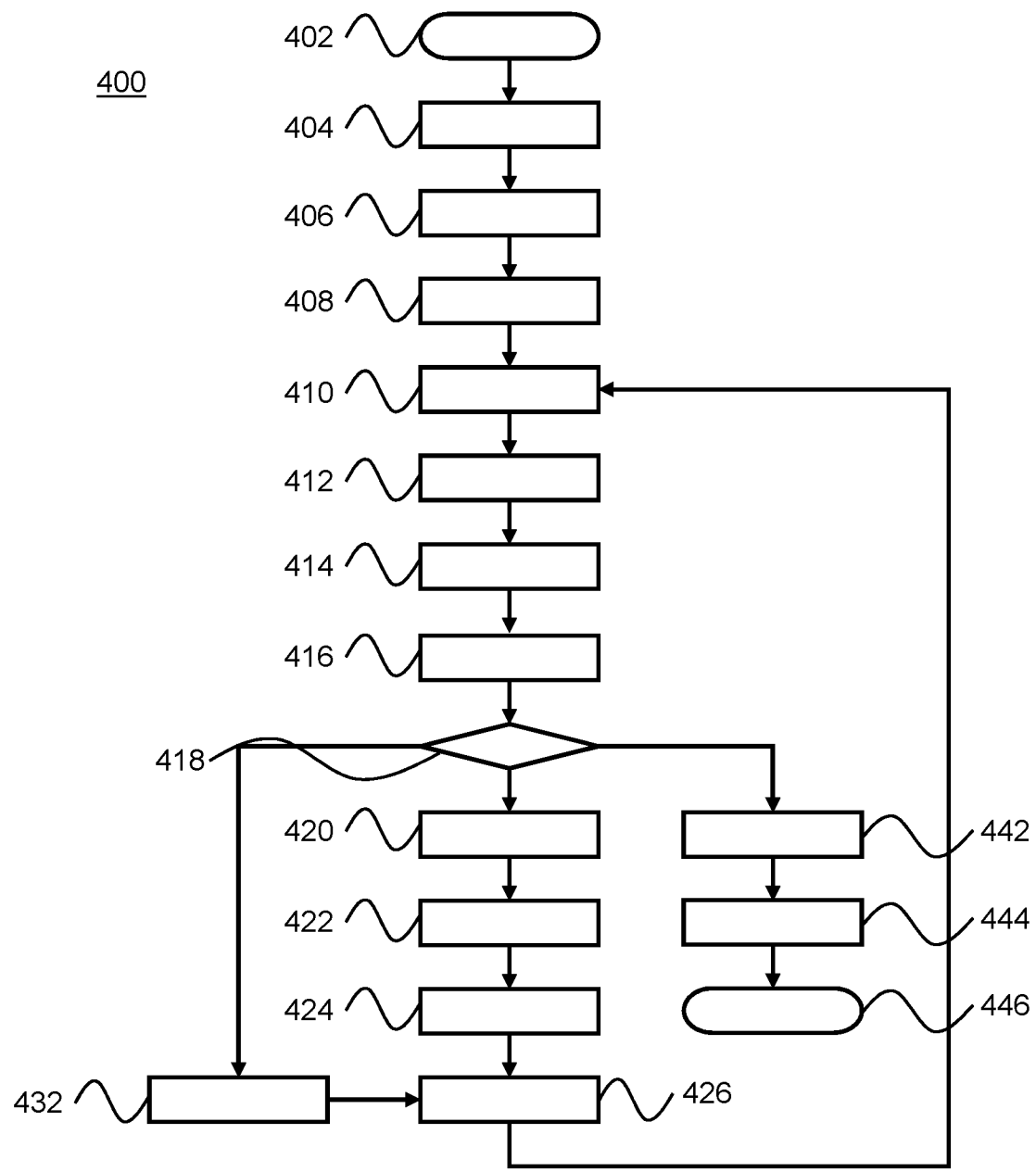
FIG. 4: shows a flowchart.

The further functionality of the driver control unit 200 and the adjustment system 180 will be discussed in further detail in conjunction with a flowchart 400 shown by FIG. 4. The various parts of the flowchart are briefly summarised in the list below.

402 start process
404 receive hold instruction
406 obtain initial hold voltage pattern
408 apply hold voltage pattern
410 obtain current
412 obtain voltage
414 determine back EMF
416 compare magnitude back EMF to validity interval
418 outcome comparison?
420 determine updated hold voltage pattern
422 obtain speed
424 adjust hold voltage pattern for speed
426 apply adjusted hold voltage pattern
432 set adjusted hold voltage to zero
442 obtain safety voltage pattern
444 apply safety voltage pattern
446 end The procedure starts in a terminator 402 and continues to step 404, in which a hold instruction is receive. The hold instruction may be received by the driver control unit 200 or by the central vehicle control unit 212. The procedure described below may be executed by the driver control unit 200, by the central vehicle control unit 212 or by both. The instruction may be received by virtue of a detection of an event. Such event may be a user input, the vehicle 300 exceeding a particular speed, engine temperature exceeding or dropping below a particular threshold, interior temperature exceeding or dropping below a particular threshold, other, or a combination thereof. The hold instruction may be preceded by an instruction to move the flap 160, in response to the detected event.

In step 406, an initial hold voltage pattern, to be applied to the electromotor 100 for executing the hold function is retrieved from the electronic memory 204. Alternatively or additionally, the initial hold voltage is determined based on a current and/or a voltage sensed on the electromotor 100. In step 408, the initial hold voltage pattern thus obtained or determined is applied to the electromotor 100. The pattern may be a continuous wave voltage. Additionally or alternatively, a switched pattern may be applied.

On top of a continuous wave, a varying pattern may be provided. In another implementation, voltage is modulated between a minimum value like zero and a maximum value, in a vehicle typically around 24 Volt or 12 Volt. The modulation and a switching modulation in particular, may be carried out periodically. As such, an average voltage is provided by means of pulse with modulation, in which the average voltage depends on the maximum voltage and the duty cycle.

In step 410, current is obtained as flowing through the electromotor 100 and in step 412, the voltage over the electromotor 100 is obtained. During this operation, preferably, supply of electrical power to the electromotor 100 is switched off—for example by means of the switch 206—and the current sensor 208 is used to measure current and voltage.

In another example, the local control unit 202 determines variations in the supply current of the electromotor 100. In one implementation, the supply current is continued to be applied during this measurement, but it may be cut or otherwise reduced as well. Based on the variations in the supply current and in particular the amount of variations per time unit, a rotational speed of the electromotor 100 may be determined.

In this way, it may be determined whether the electromotor 100 and with that, the flap 160 may be detected, for example when a hold pattern, like the initial hold pattern, is applied. As indicated above, the variations generally occur in brushed DC electromotors, for which this example is particularly suitable.

In step 414, the back electromotive force—the back EMF—is determined as an indication whether the rotor of the electromotor is moving; without movement, there is no back EMF and if the back EMF is not zero, the rotor of the electromotor is moving relative to the stator. The back EMF—BEMF—is determined as:

$$V_{bat} = BEMF + R \cdot I + \varepsilon \frac{di}{dt}$$

With $V_{bat}$ being the supply or battery voltage, R being the winding resistance as an example of a value of a motor parameter comprises by motor data, I being the supply current, $\varepsilon$ being a motor-specific constant and di/dt the derivative of the supply current over time.

With $V_{bat}$ and di/dt being zero with the switch 206 switched off, the back EMF is substantially the same as the voltage measured or the current measured multiplied by the resistance of the windings. In addition to the windings, also other data may be used to derive the back EMF from the measure voltage and/or the measured current, in step 414.

If the movement of the electromotor 100 has been determined by means of counting variations in the supply current, an adjusted hold voltage pattern may be applied based on the determined movement speed of the rotor of the electromotor 100, i.e. based on the amount of determined or counted variations in the supply current per unit time.

In step 416, the back EMF or a derivative thereof related to the back EMF and in particular the magnitude thereof is compared to a validity interval. If the back EMF or related value is lower than the validity interval, the process branches via decision 418 to step 432. In step 432, the hold voltage pattern is set to zero and the zero voltage hold pattern is applied to the electromotor in step 426.

If the back EMF value or related value is within the validity interval, it is determined that the electromotor 100 moves without electrical power being supplied to the electromotor 100. As such, the back EMF value or relate value constitutes movement data. The movement may result from an air flow acting on the flap 160. The air flow may occur from the vehicle 300 driving at a particular speed, which air flow provides a force acting on the flap 160, resulting in a torque, which results in a movement.

In another implementation, movement of the rotor 110 of the electromotor is, additionally or alternatively, determined by means of a mechanical detector or electromechanical detector, like a switch, a potmeter, other, or a combination thereof. Such sensor or detector may be directly connected to the rotor 110 or via a drive train. In the latter case, the sensor or detector may also be arranged to detect or sense movement of the flap 160 to acquire movement data.

In again another implementation, movement of the rotor 110 of the electromotor is, additionally or alternatively, determined by determining whether the rotor of the electromotor moves—rotates—relative to the stator of the electromotor based on further electrical parameters. This may be determined by means of the following equation:

$$V_{bat} = I_m \times R_{coil} - K_v \times \omega$$

In which $V_{bat}$ is the voltage applied at the terminals of the electromotor, $I_m$ is the current through the electromotor, $K_v$ is a motor-specific constant and $\omega$ is the rotational speed of the rotor.

This equation may be rewritten as:

$$\omega = \frac{I_m \times R_{coil} - V_{bat}}{K_v}$$

From this equation, it may be determined directly whether the rotor of the electromotor moves—rotates—or not. If the outcome of the division is non-zero, the rotor moves. If it is zero, the rotor does not move. As such, the back EMF and the rotational speed of the rotor are related values. Based on the rotational speed, an updated hold voltage pattern is determined in step 420.

If—without external force applied—the voltage applied to the motor would result in a clockwise direction and the movement detected is clockwise, the voltage applied is adjusting by decreasing the voltage applied earlier—gradually, stepwise, other, or a combination thereof—to provide an adjusted voltage pattern.

If—without external force applied—the voltage applied to the motor would result in a clockwise direction and the movement detected is counter clockwise, the voltage applied is adjusting by increasing the voltage applied earlier—gradually, stepwise, other, or a combination thereof—to provide an adjusted voltage pattern.

If—without external force applied—the voltage applied to the motor would result in a counter clockwise direction and the movement detected is counter clockwise, the voltage applied is adjusting by decreasing the voltage applied earlier—gradually, stepwise, other, or a combination thereof—to provide an adjusted voltage pattern.

If—without external force applied—the voltage applied to the motor would result in a counter clockwise direction and the movement detected is clockwise, the voltage applied is adjusting by increasing the voltage applied earlier—gradually, stepwise, other, or a combination thereof—to provide an adjusted voltage pattern.

Prior to applying the adjusted voltage pattern thus adjusted, the adjusted voltage pattern may be compared to a safety value in step 418. Hence, alternatively or additionally, the safety check of step 418 may be implemented after step 420.

Next, the movement speed is determined again, by newly acquiring voltage and current characteristics of the motor, as described above. Subsequently, in case required, the voltage applied to the motor is adjusted again. By using this implementation, the measurements for determining whether the rotor moves and thus for determining whether or not hold voltage is to be adjusted may be executed without a requirement for interrupting the electrical power supply to the electromotor.

With the back EMF value or related value being within the validity interval, an updated hold voltage pattern is determined in step 420. The hold voltage pattern may be retrieved from the electronic memory 204, determined based on the back EMF value or the related value, other, or a combination thereof. Optionally, the updated hold voltage pattern thus obtained is adjusted for speed of the vehicle 300 in step 424, which value of speed is generally available to the central vehicle control unit 212 and obtained in step 422, either by the central vehicle control unit 212, the driver control module 200 or both. In step 426, the adjusted hold voltage pattern is applied to the electromotor 100.

If, in decision 418, it is determined that the magnitude of the back EMF value or related value is above the validity interval, the hold voltage to be applied to the electromotor 100 to counteract a force acting on the flap 160 may be too high and may result in damage to the electromotor 100, like a burn-out. Alternatively or additionally, a too high voltage may result in extremely high forces on mechanical parts connected to the rotor of the electromotor, which may result in damage to those parts. If it is determined that the magnitude of the back EMF value or related value is too high, the process branches from the decision 418 to step 442.

In step 442, a safety voltage pattern is obtained, for example from the electronic memory 204. The safety voltage pattern may be a zero voltage pattern, in which case the flap 160 is allowed to move to an equilibrium position relative to the air flow, with zero torque. Alternatively, an active supply voltage pattern is determined to be applied to the electromotor 100 to move the flap 106 to such zero torque position, or to another position. In such scenario, the active supply voltage pattern of the safety voltage pattern has a sign opposite to that of the initial hold voltage or to that of the adjusted hold voltage. This allows the electromotor to move in the direction to which the external force is directed. In step 444, the safety voltage pattern is applied to the electromotor 100 and in terminator 446, the procedure ends.

The invention claimed is:

1. In an electronic control circuit, a method of controlling an electromotor of an actuator for controlling a position of an actuatable object of a vehicle, the method comprising:
   receiving an instruction to hold position of the actuatable object;
   obtaining an initial hold voltage pattern for the electromotor;
   applying the initial hold voltage pattern to the electromotor;
   determining movement data on movement of the actuatable object;
   determining an adjusted hold voltage pattern based on the movement data; and
   applying the adjusted hold voltage pattern to the electromotor.

2. The method according to claim 1, wherein determining movement data comprises:
   determining at least one of a motor current through the electromotor and a motor voltage over the electromotor;
   obtaining motor data;
   based on the motor data and the at least one of the motor current and the motor voltage, determining the back electromotive force of the electromotor;
   based on the back electromotive force, determining the movement data.

3. The method according to claim 2, further comprising determining the adjusted hold voltage pattern based on the back electromotive force.

4. The method according to claim 2, further comprising:
   comparing a magnitude of the back electromotive force to a first pre-determined value;
   determining, if the magnitude of the back electromotive force is less than the first pre-determined value, that the adjusted voltage pattern is zero.

5. The method according to claim 2, further comprising:
   comparing a magnitude of the back electromotive force to a second pre-determined value;
   if the magnitude of the back electromotive force exceeds the second pre-determined value, performing one of:
      setting the adjusted voltage pattern to zero; and
      determining, based on the back electromotive force, a safety voltage pattern and applying the safety voltage pattern to the electromotor.

6. The method according to claim 5, wherein the safety voltage pattern is arranged to move the electromotor in the direction of the movement of the actuatable object indicated by the movement data.

7. The method according to claim 6, wherein the electromotor is a brushed DC motor and a first sign of the at least one of the initial hold voltage and the adjusted hold voltage is opposite to a second sign of the safety voltage pattern.

8. The method according to claim 1, wherein determining movement data on movement of the actuatable object comprises:
   monitoring a current through the electromotor;
   determining an amount of variations in the monitored current;
   determining an amount of variations per unit time;
   based on the amount of variations per unit time, determining the movement data.

9. The method according to claim 1, wherein obtaining an initial hold voltage pattern for the electromotor comprises
   determining the back electromotive force of the electromotor; and
   determining the initial hold voltage pattern for the electromotor based on the determined back electromotive force of the electromotor.

10. The method according to claim 1, further comprising:
    obtaining vehicle speed data related to a speed of the vehicle; and
    determining the adjusted hold voltage pattern is based on the vehicle speed data.

11. The method according to claim 1, wherein obtaining the initial hold voltage pattern for the electromotor comprises retrieving a voltage value from an electronic memory.

12. The method according to claim 1, further comprising:
determining the adjusted hold voltage pattern based on the movement data such that the actuatable object is held in the current position;
obtaining a pre-determined safety voltage pattern;
comparing the determined hold voltage pattern to the safety voltage pattern;
based on the comparing, determining whether the determined hold voltage pattern is safe to apply to the electromotor;
if the determined hold voltage is determined as safe to be applied, applying the determined hold voltage.

13. The method according to claim 1, wherein the adjusted hold voltage pattern comprises a waveform that varies in time between a maximum value and a minimum value.

14. The method according to claim 13, wherein determining movement data comprises:
determining at least one of a motor current through the electromotor and a motor voltage over the electromotor;
obtaining motor data;
based on the motor data and the at least one of the motor current and the motor voltage, determining the back electromotive force of the electromotor;
based on the back electromotive force, determining the movement data; and
wherein the magnitude of the average value of the voltage of the adjusted hold voltage pattern is substantially equal to the magnitude of the back electromotive force.

15. An electronic control circuit arranged to control an electromotor of an actuator for controlling a position of an actuatable object in a vehicle, the control circuit being arranged to:
receive an instruction to hold position of the actuatable object;
obtain an initial hold voltage pattern for the electromotor;
apply the initial hold voltage pattern to the electromotor;
determine movement data on movement of the actuatable object;
determine an adjusted hold voltage pattern based on the movement data; and
apply the adjusted hold voltage pattern to the electromotor.

16. A control module arranged to control a position of an actuatable object in a vehicle, the control module comprising: an actuator comprising electromotor connected to the actuatable object and arranged to drive the actuatable object;
the electronic control circuit according to claim 15 connected to the electromotor and arranged to control the electromotor.

17. The control module according to claim 16, wherein the electromotor is a brushed DC motor.

18. A vehicle comprising:
a flap for guiding an airflow as an actuatable object; and
the control module according to claim 16 of which the electromotor is connected to the actuatable object.

* * * * *